(12) United States Patent
Yoshida

(10) Patent No.: US 8,243,323 B2
(45) Date of Patent: Aug. 14, 2012

(54) IMAGE FORMING APPARATUS

(75) Inventor: Hidefumi Yoshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 12/409,332

(22) Filed: Mar. 23, 2009

(65) Prior Publication Data

US 2010/0046042 A1   Feb. 25, 2010

(30) Foreign Application Priority Data

Aug. 20, 2008  (JP) ................................. 2008-212272
Feb. 9, 2009   (JP) ................................. 2009-027792

(51) Int. Cl.
  *H04N 1/40*  (2006.01)
(52) U.S. Cl. ........................... 358/1.7; 358/509; 358/474
(58) Field of Classification Search ................... 358/1.9, 358/2.1, 1.7, 1.4, 505–511, 474, 486–487, 358/496–497, 408
  See application file for complete search history.

(56) References Cited

U.S. PATENT DOCUMENTS

| 6,362,470 | B1 | 3/2002 | Yoshida et al. | 250/235 |
| 6,476,955 | B1 | 11/2002 | Yoshida | 359/204 |
| 6,833,855 | B2 | 12/2004 | Yoshida | 347/241 |
| 7,746,366 | B2 * | 6/2010 | Motoyama | 347/111 |

FOREIGN PATENT DOCUMENTS

| JP | 2-050176 | 2/1990 |
| JP | 2003-182146 | 7/2003 |
| JP | 2003-276235 | 9/2003 |
| JP | 2005-304011 | 10/2005 |

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

An image forming apparatus includes a scanning unit which scans a light beam on a photosensitive member in accordance with image data, and a smoothing unit which performs a smoothing for a jaggy of a scan line of a light beam scanned on the photosensitive member by the scanning unit. The smoothing unit does not perform the smoothing when the scanning unit scans a light beam in accordance with image data representing a halftone image.

9 Claims, 14 Drawing Sheets

F I G. 3A
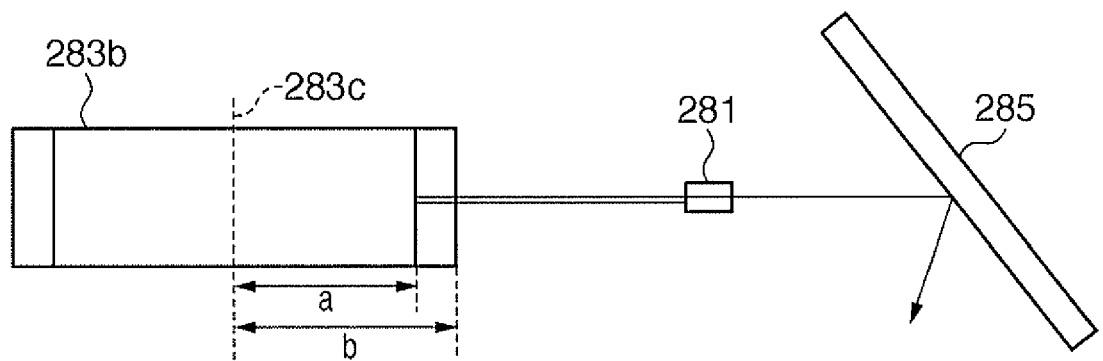
F I G. 3B
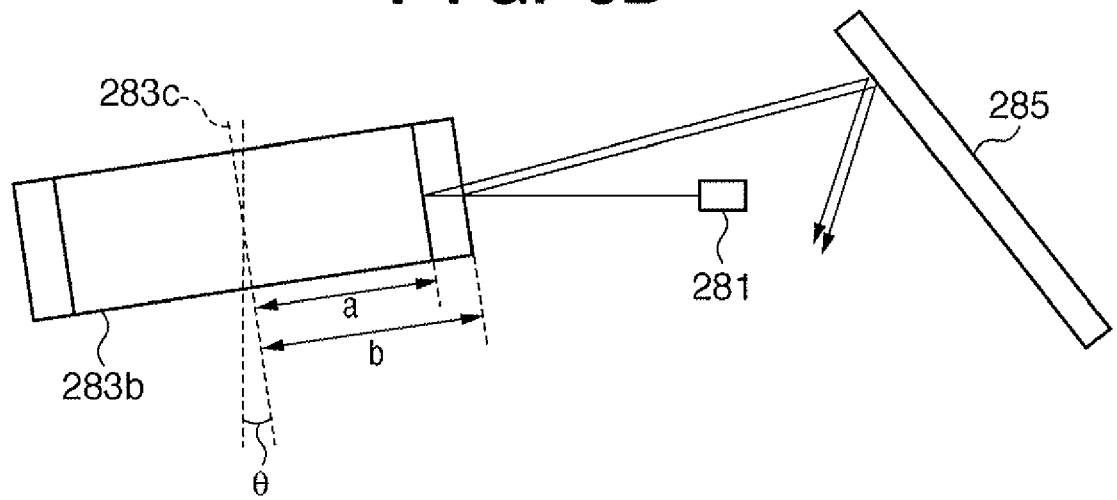
F I G. 3C
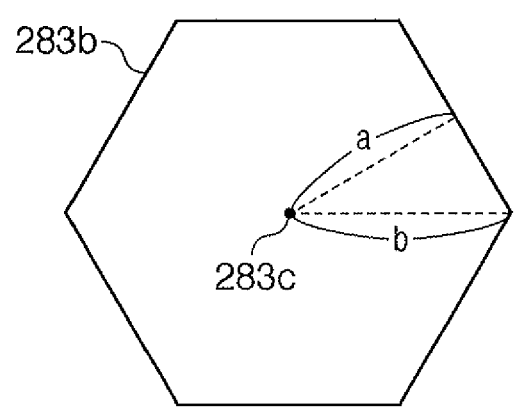

FIG. 10

| PIXEL ID | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| SECOND SELECT LINE | LINE 2 | | | | | | | | | | LINE 3 | | | | | | | | | | LINE 4 | | |
| FIRST SELECT LINE | LINE 1 | | | | | | | | | | LINE 2 | | | | | | | | | | LINE 3 | | |
| CORRECTION AMOUNT | 1 | 1.1 | 1.2 | 1.3 | 1.4 | 1.5 | 1.6 | 1.7 | 1.8 | 1.9 | 2 | 2.1 | 2.2 | 2.3 | 2.4 | 2.5 | 2.6 | 2.7 | 2.8 | 2.9 | 3 | 3.1 | 3.2 |
| INTERPOLATION COEFFICIENT | 0 | 0.1 | 0.2 | 0.3 | 0.4 | 0.5 | 0.6 | 0.7 | 0.8 | 0.9 | 0 | 0.1 | 0.2 | 0.3 | 0.4 | 0.5 | 0.6 | 0.7 | 0.8 | 0.9 | 0 | 0.1 | 0.2 |

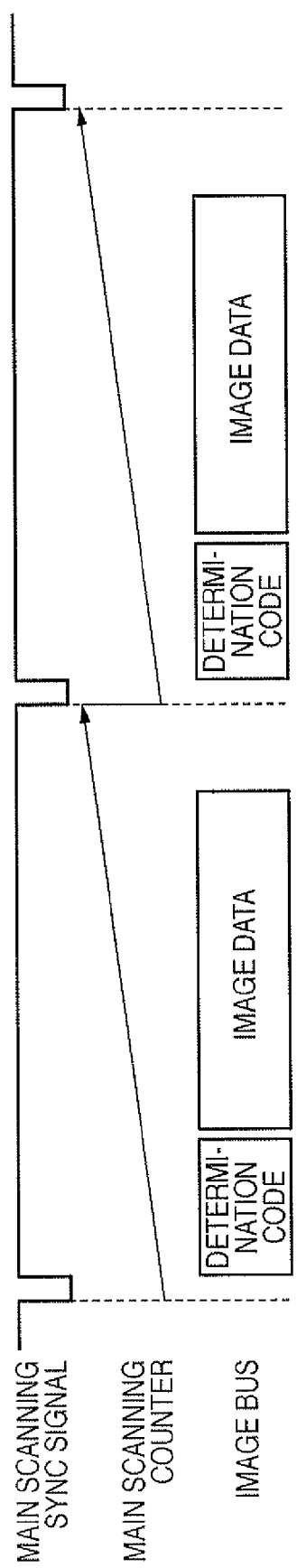

IMAGE FORMING APPARATUS

BACKGROUND OF THE INVENTION

1. Field of the Invention

The present invention relates to an image forming apparatus having a scanning unit which scans a light beam on a photosensitive member in accordance with image data.

2. Description of the Related Art

Recent electrophotographic image forming apparatuses form images by reflecting a laser beam emitted in accordance with image data by a rotating polygonal mirror, and scanning the laser beam on a photosensitive member. When a rotating shaft 283c of a polygonal mirror 283b inclines from an ideal position (FIG. 3A) by an angle θ, a laser beam fluctuates in the circumferential direction of a photosensitive member 21 while scanned by one line in the main scanning direction, as shown in FIG. 3B. If the laser beam fluctuates in the circumferential direction of the photosensitive member 21, the scan path curves as represented by a solid line 402 in FIG. 4 while the laser beam is scanned by one line in the main scanning direction. In a color image forming apparatus, the scan path of a laser beam sometimes differs between respective colors. Image misregistration between the colors occurs and appears as a blurred (unsharp) image.

To suppress the fluctuations in the circumferential direction of the photosensitive member, correction lenses having different refractive indices in the circumferential direction may be interposed in the optical path of a laser beam in accordance with scan positions. However, this method requires labor costs in processing, attachment, and adjustment of correction lenses, raising the cost.

To prevent this, Japanese Patent Laid-Open Nos. 02-050176, 2003-276235, and 2005-304011 propose processing of making a curved scan path come close to an ideal one by scanning areas a and e by a scan line 502, areas b and d by a scan line 503, and an area c by a scan line 504, as shown in FIG. 5.

When this processing is executed, a jaggy sometimes stands out at a position where the scan line switches, as shown in FIG. 7A. Japanese Patent Laid-Open No. 2003-182146 proposes interpolation processing of smoothing the jaggy by PWM (Pulse Width Modulation)-controlling a laser beam before and after switching the scan line, as shown in FIG. 7B.

Images to be formed by an image forming apparatus include texts, line images, and halftone images such as a photograph. The image apparatus forms an image by executing dither processing or the like for halftone image data.

However, if image data having undergone dither processing undergoes interpolation for smoothing, the density in the dither pattern is unbalanced, or small dots are generated, as shown in FIG. 11C. The unbalanced density in the dither pattern and an unstable toner amount attached to small dots influence the reproducibility of the halftone density.

SUMMARY OF THE INVENTION

The present invention has been made to overcome the conventional drawbacks, and has as its object to provide an image forming apparatus having the following arrangement.

According to one aspect of the present invention, there is provided an image forming apparatus comprising: a scanning unit which scans a light beam on a photosensitive member in accordance with image data; and a smoothing unit which performs a smoothing for a jaggy of a scan line of a light beam scanned on the photosensitive member by the scanning unit, wherein the smoothing unit does not perform the smoothing when the scanning unit scans a light beam in accordance with image data representing a halftone image.

Further features of the present invention will become apparent from the following description of exemplary embodiments with reference to the attached drawings.

BRIEF DESCRIPTION OF THE DRAWINGS

FIGS. 3A to 3C are views for explaining the optical path of a laser beam when a rotating shaft 283c of a polygonal mirror 283b inclines;

FIG. 10 is a view for explaining the detailed operation of a correction amount calculation unit 104;

FIG. 12 is a timing chart showing timings when a central image processing unit 95 outputs a determination code and image data to an output image processing unit 96;

DESCRIPTION OF THE EMBODIMENTS

Preferred embodiments of the present invention will be exemplified in detail below with reference to the accompanying drawings. Components set forth in the embodiments are merely examples, and the technical scope of the present invention should be determined by the scope of the appended claims and is not limited to the individual embodiments to be described below.

(First Embodiment)

Figure 1:
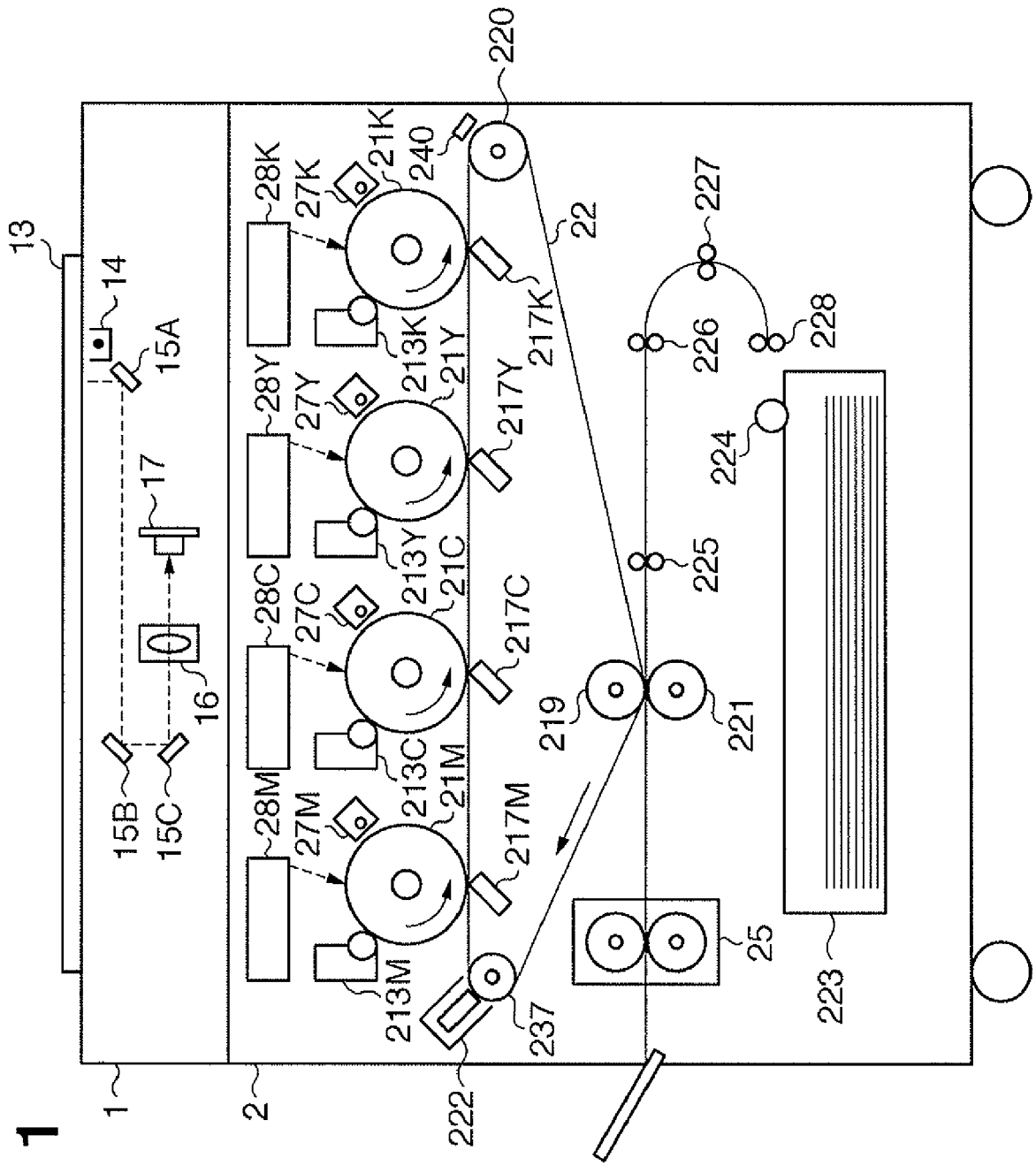
FIG. 1 is a sectional view showing the schematic structure of an electrophotographic image forming apparatus according to an embodiment of the present invention.

FIG. 1 is a sectional view showing the schematic structure of an electrophotographic image forming apparatus according to the first embodiment of the present invention. An outline of a color reading apparatus (color scanner) 1 and color image printing apparatus (color printer) 2 will be explained with reference to FIG. 1.

The color scanner 1 forms the image of a document 13 on a color sensor 17 via an illumination lamp 14, mirrors 15A, 15B, and 15C, and a lens 16. The color sensor 17 reads color image information of the document for respective color components (blue (B), green (G), and red (R)), and converts the pieces of color image information into electrical image signals.

An image processing unit (not shown) converts the B, G, and R color components obtained by the color scanner 1 into black (K), cyan (C), magenta (M), and yellow (Y) color image data on the basis of the image signal intensity levels of the B, G, and R color components. The image processing unit sends the M, Y, C, and K color image data to the color printer 2.

In the color printer 2, write optical units 28M (for magenta), 28Y (for yellow), 28C (for cyan), and 28K (for black) emit laser beams corresponding to the color image data (M, Y, C, and K) sent from the color scanner 1. The write optical units 28M, 28Y, 28C, and 28K form electrostatic latent images on photoconductive bodies 21M (for magenta), 21Y (for yellow), 21C (for cyan), and 21K (for black) arranged in correspondence with the respective colors.

Each of the photoconductive bodies 21M, 21Y, 21C, and 21K rotates in a direction indicated by an arrow. The photoconductive bodies 21M, 21Y, 21C, and 21K are surrounded with chargers 27M (for magenta), 27Y (for yellow), 27C (for cyan), and 27K (for black) arranged in correspondence with the respective colors. Developing units 213M, 213C, 213Y, and 213K are arranged in contact with the photoconductive bodies 21M, 21C, 21Y, and 21K, respectively. Each developing unit includes a developing sleeve which applies a developer to the surface of a corresponding photosensitive member to develop an electrostatic latent image, and a developing paddle which rotates to supply and stir a developer.

Transfer bias blades 217M, 217Y, 217C, and 217K are arranged at positions where they face the photoconductive bodies 21M, 21C, 21Y, and 21K via an intermediate transfer belt 22. The intermediate transfer belt 22 is looped between a driving roller 220 driven to rotate by a driving motor (not shown), and driven rollers 219 and 237.

A transfer bias roller 221 is arranged at a position where it faces the driven roller 219 via the intermediate transfer belt 22. A separation/contact mechanism for driving the transfer bias roller 221 so that it can be separated from or brought into contact with the intermediate transfer belt 22 is arranged. A belt cleaning unit 222 is arranged at a predetermined position where it faces the driven roller 237 via the intermediate transfer belt 22.

The belt cleaning unit 222 is separated from the belt surface till the end of transferring the trailing end of an image of the final color onto the belt after the start of printing. At a predetermined timing after the end of the transfer, the separation/contact mechanism (not shown) brings the belt cleaning unit 222 into contact with the belt surface to clean the surface of the intermediate transfer belt 22.

The color printer 2 starts forming a magenta (M) image first. Then, the color printer 2 starts forming a cyan image at a timing calculated from the rotational speed of the intermediate transfer belt 22 and the distance between the photoconductive bodies 21M and 21C. The color printer 2 starts forming a yellow image at a timing calculated from the rotational speed of the intermediate transfer belt 22 and the distance between the photoconductive bodies 21C and 21Y. The color printer 2 starts forming a black image at a timing calculated from the rotational speed of the intermediate transfer belt 22 and the distance between the photoconductive bodies 21Y and 21K.

Image formation for magenta (M) will be explained. Image formation for the remaining colors is also the same as that for magenta. After the start of laser exposure of the photosensitive member 21M, the developing sleeve of the developing unit 213M rotates to apply a developing bias to the developing unit 213M in order to develop a magenta (M) latent image. A magenta toner image (first image) formed on the photosensitive member 21M is transferred to the intermediate transfer belt 22 by the transfer bias blade 217M, and held on the intermediate transfer belt 22. The series of operations are executed sequentially in the remaining yellow, cyan, and black units. A full-color toner image obtained by superposing toner images of the respective colors is formed on the intermediate transfer belt 22.

After forming the full-color toner image on the intermediate transfer belt 22, the separation/contact mechanism moves the transfer bias roller 221 to a position where it contacts the intermediate transfer belt.

At a predetermined timing before the full-color toner image is formed on the intermediate transfer belt 22, a print sheet is conveyed from a cassette 223 via a feeding roller 224 and conveyance rollers 226, 227, and 228, and stands by at the position of registration rollers 225. When the transfer bias roller 221 comes into contact with the intermediate transfer belt 22, the registration rollers 225 start rotating to convey the standby print sheet to the transfer bias roller 221 so that the toner image on the intermediate transfer belt 22 is transferred to the print sheet. A predetermined transfer bias is applied to the transfer bias roller 221, transferring the toner image on the intermediate transfer belt 22 to the print sheet.

The print sheet bearing the toner image is conveyed to a fixing unit 25. The toner image is fused and fixed to the print sheet by upper and lower fixing rollers controlled to a predetermined temperature.

After transferring the toner image to the print sheet, the belt cleaning unit 222 cleans the surface of the intermediate transfer belt 22, ending a series of image forming operations.

Figure 2A:
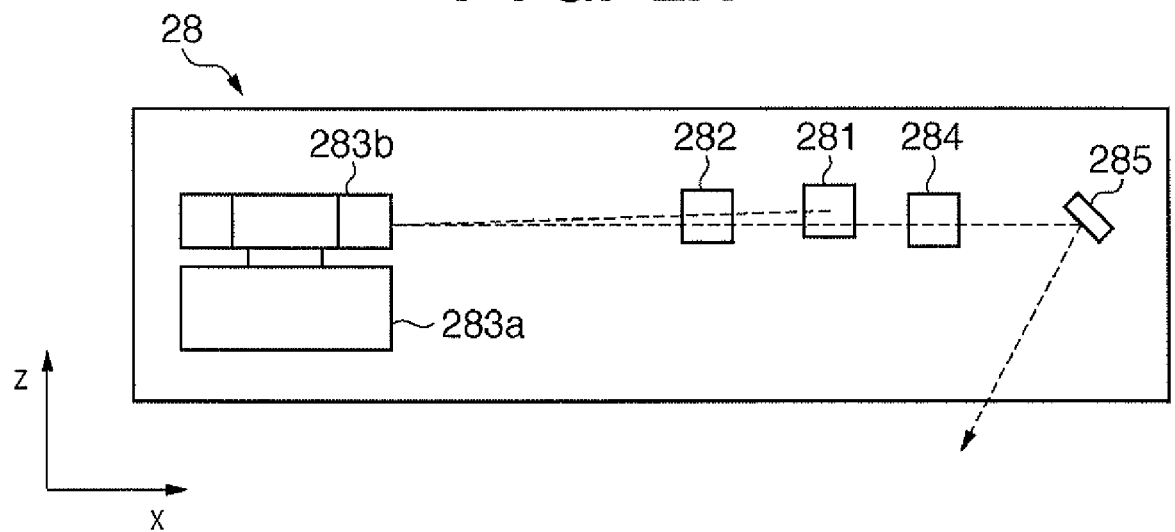
FIGS. 2A and 2B are views showing the arrangement of a write optical unit 28.
Figure 2B:
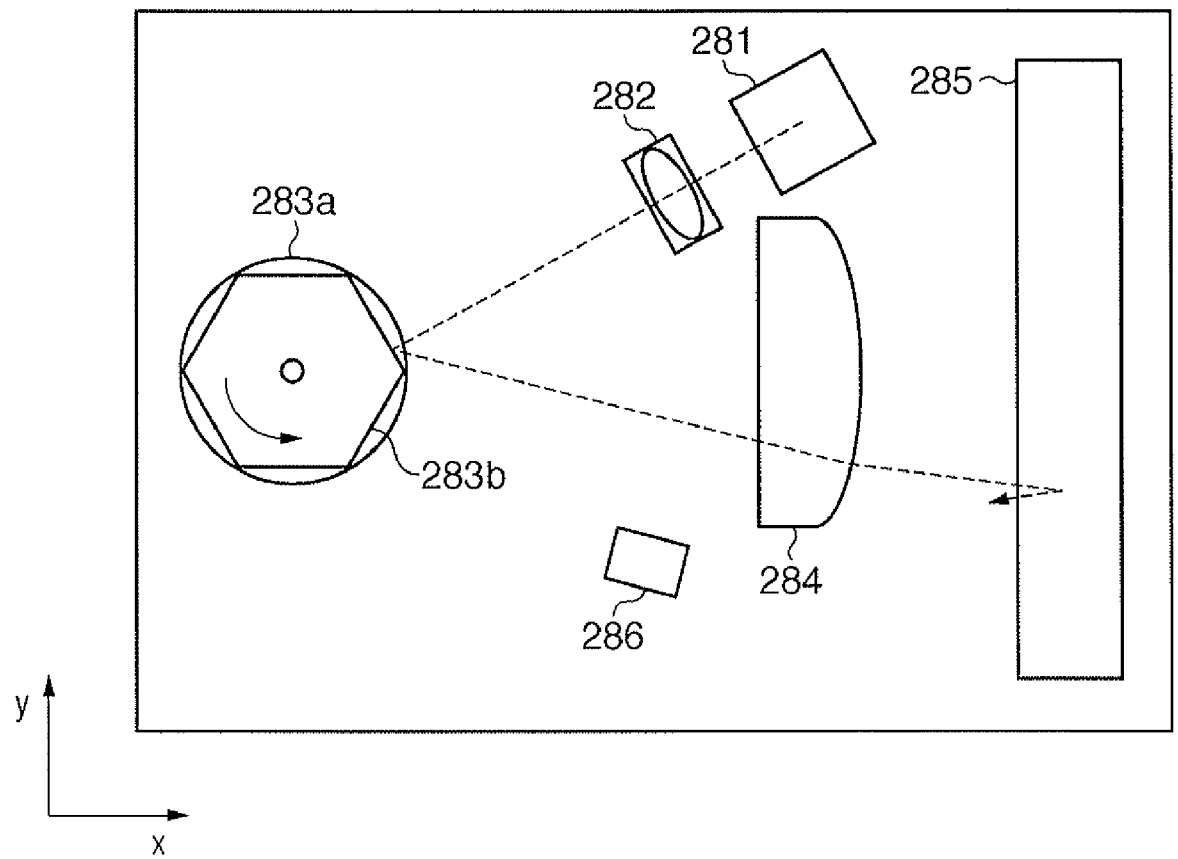

The arrangement of a write optical unit 28 will be explained with reference to FIGS. 2A and 2B. FIG. 2A is a side view (x-z plane) of the arrangement of the write optical unit 28. FIG. 2B is a plan view (x-y plane) of the arrangement of the write optical unit 28. A light emitting element array 281 has four light emitting elements, and emits laser beams of four lines in accordance with image data. The light emitting element array 281 may also emit a light beam other than a laser beam. The laser beams emitted from the light emitting element array 281 irradiate the respective surfaces of a polygonal mirror 283b via a lens 282. The polygonal mirror 283b is driven to rotate by a polygon motor 283a, and deflects the laser beams from the light emitting element array 281. The laser beams deflected by the polygonal mirror 283b enter a BD (Beam Detect) detection element 286 at predetermined time intervals. Every time the BD detection element 286 detects a laser beam, it outputs a BD signal. The BD signal is used as a trigger for starting exposure of each scan line.

The laser beams deflected by the polygonal mirror 283b irradiate the photosensitive member 21 via an Fv lens 284 and plane mirror 285. In this way, the laser beam scans the photosensitive member 21 to form a latent image on the photosensitive member 21.

The curvature of the scan line generated by the positional error or deformation of an optical member in the write optical unit 28 will be explained. FIGS. 3A to 3C are views for explaining the optical path of a laser beam when a rotating shaft 283c of the polygonal mirror 283b inclines. For descriptive convenience, the arrangement is simplified and the inclination is exaggerated in FIGS. 3A to 3C. FIG. 3A shows the optical path of a laser beam when the rotating shaft 283*c* of the polygonal mirror 283*b* is at an ideal position. FIG. 3B shows the optical path of a laser beam when the rotating shaft 283*c* of the polygonal mirror 283*b* inclines from the ideal position by an angle θ. FIG. 3C is a plan view of the polygonal mirror 283*b*.

As is apparent from FIG. 3C, as the polygonal mirror 283*b* rotates, the position of the reflecting surface of the polygonal mirror 283*b* moves between distances a and b viewed from the rotating shaft 283*c*. When the rotating shaft 283*c* of the polygonal mirror 283*b* is at an ideal position, the optical path of a laser beam exists within the same plane regardless of whether the laser beam is reflected by a reflecting surface at the distance a viewed from the rotating shaft 283*c* or that at the distance b viewed from the rotating shaft 283*c*, as shown in FIG. 3A. However, if the rotating shaft 283*c* of the polygonal mirror 283*b* inclines from the ideal position by the angle θ, the optical path of a laser beam reflected by the reflecting surface at the distance a viewed from the rotating shaft 283*c* and that of a laser beam reflected by the reflecting surface at the distance b viewed from the rotating shaft 283*c* exist in different planes, as shown in FIG. 3B. That is, the laser beam fluctuates in the circumferential direction of the photosensitive member 21 while scanned by one line in the main scanning direction.

Figure 4:
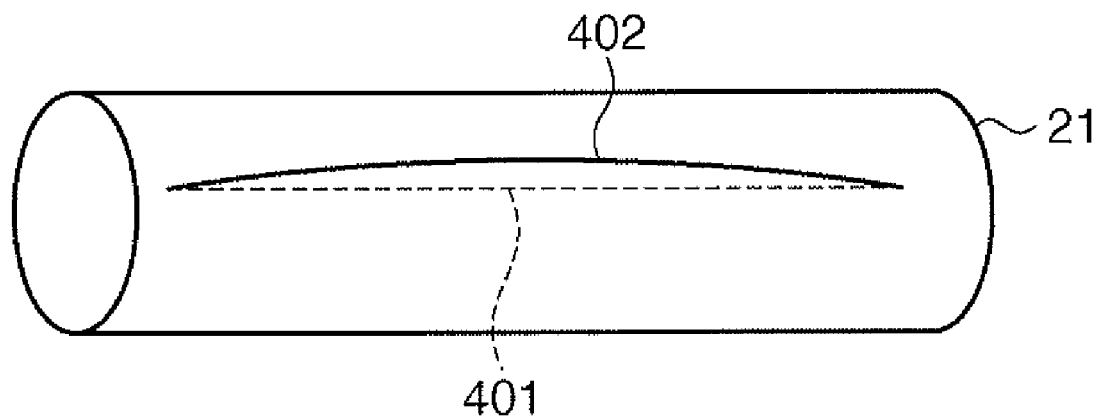
FIG. 4 is a view showing the path (locus) of a laser beam in the main scanning direction that irradiates a photosensitive member 21.

FIG. 4 is a view showing the path (locus) of a laser beam in the main scanning direction that irradiates the photosensitive member 21. A solid line 401 represents the ideal scan path of a laser beam when the rotating shaft 283*c* of the polygonal mirror 283*b* is at an ideal position. A solid line 402 represents the scan path of a laser beam when the rotating shaft 283*c* of the polygonal mirror 283*b* inclines from the ideal position. When the rotating shaft 283*c* of the polygonal mirror 283*b* inclines from the ideal position, the laser beam fluctuates in the circumferential direction of the photosensitive member 21 while scanned by one line in the main scanning direction. As a result, the scan path curves as represented by the solid line 402, i.e., the scan line of a laser beam distorts. The distortion of the scan line of a laser beam is caused by the positional error or deformation of optical members (e.g., a lens and mirror) of the write optical unit 28, in addition to the inclination of the rotating shaft of the polygonal mirror. The distortion of the scan line of a laser beam includes the inclination of the scan line in addition to the curvature of the scan line of a laser beam.

Figure 5:
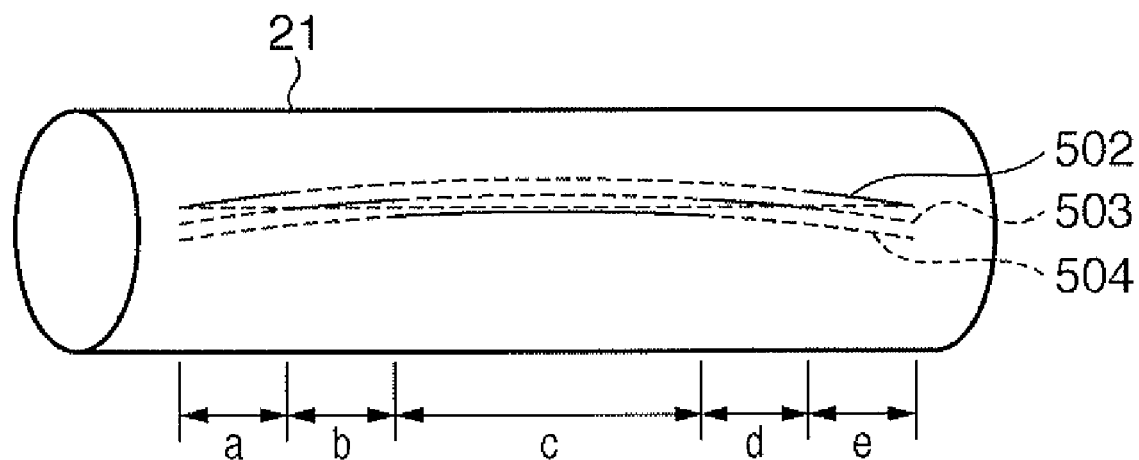
FIG. 5 is a view for explaining digital registration.

The curvature of the scan line is corrected by digital registration. FIG. 5 is a view for explaining the digital registration. The digital registration makes a curved scan path come close to an ideal one by scanning areas a and e by a scan line 502, areas b and d by a scan line 503, and an area c by a scan line 504, as shown in FIG. 5. A plurality of areas a to e in the main scanning direction are determined in accordance with the degree of curvature of the scan line. An output image processing unit 96 (to be described later) achieves this processing by shifting image data for each scan line in each of the main scanning areas a to e. Accordingly, the curvature of the scan line of a laser beam is corrected. The inclination of the scan line of a laser beam can also be corrected by the digital registration.

Figure 6:
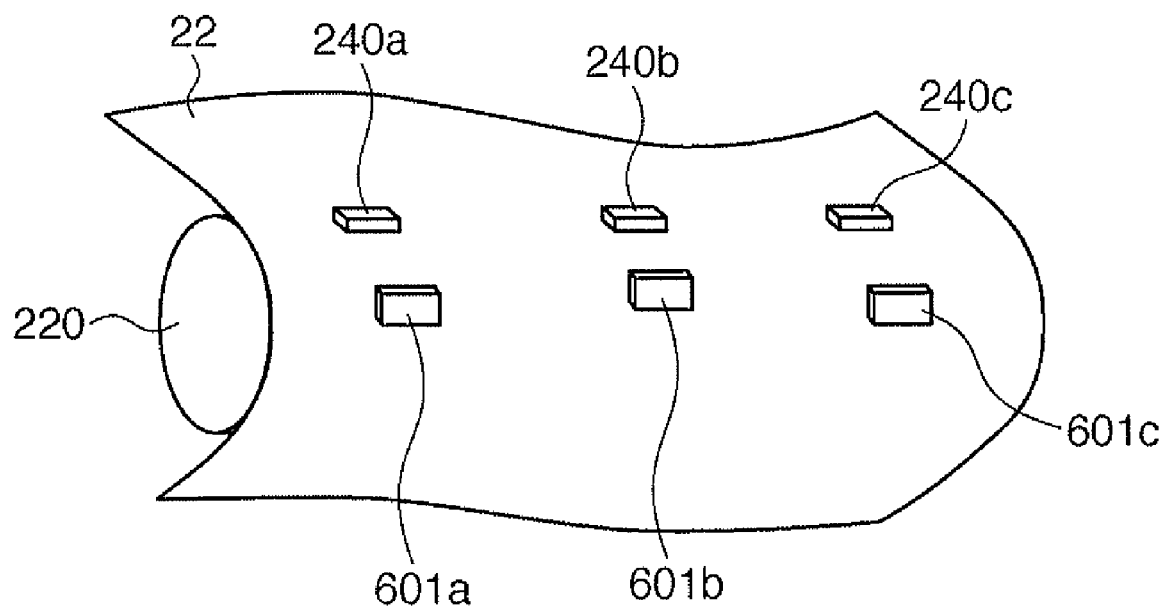
FIG. 6 is a view showing an arrangement for detecting the degree of curvature of the scan line.

FIG. 6 shows an arrangement for detecting the degree of curvature of the scan line. As shown in FIGS. 1 and 6, the image forming apparatus includes patch detection sensors 240*a* to 240*c* which detect patches 601*a* to 601*c* formed on the intermediate transfer belt 22. By the above-mentioned image forming methods the three patches 601*a* to 601*c* are formed on the intermediate transfer belt 22. The patches 601*a* to 601*c* are formed to be aligned on a scan line when scanned by an ideal scan path. The degree of curvature of the scan line is obtained from the difference between timings when the patch detection sensors 240*a* to 240*c* detect the patches 601*a* to 601*c*, respectively. In this fashion, the distortion of the scan line of a laser beam is detected. The detection result of the distortion of the scan line of a laser beam is stored as correction information in a curvature characteristic memory 106.

Figure 7A:
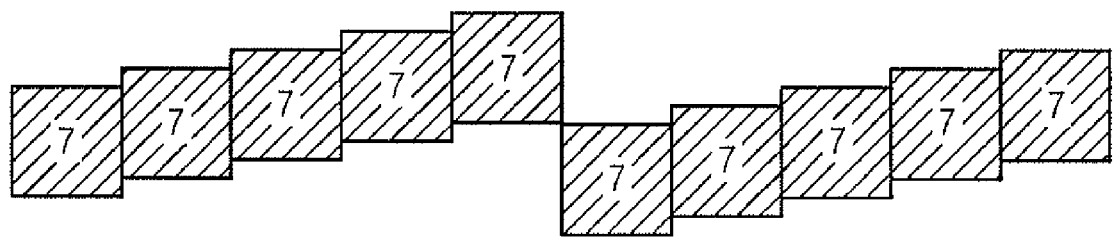
FIGS. 7A and 7B are views for explaining interpolation processing of smoothing a jaggy generated by digital registration.
Figure 7B:
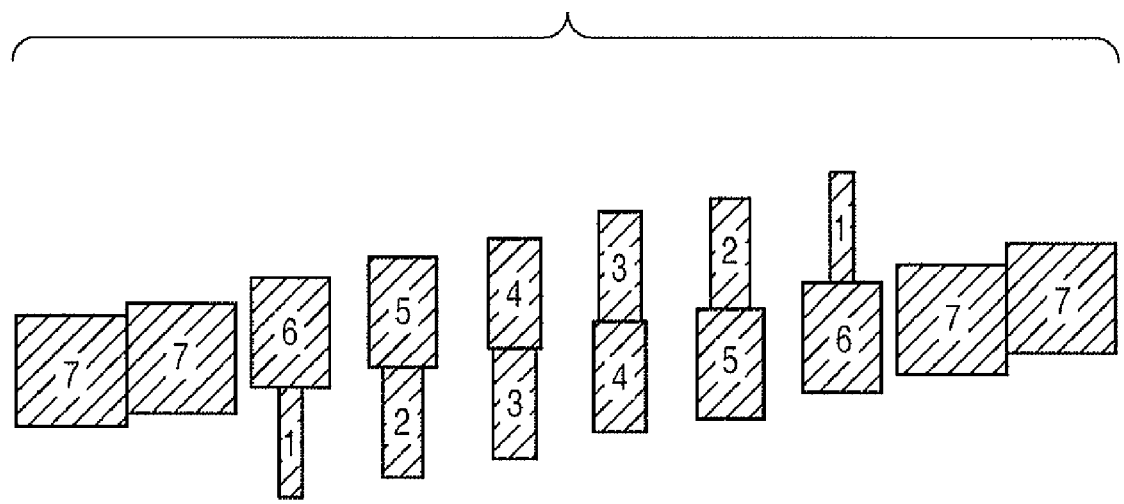

FIGS. 7A and 7B are views for explaining interpolation processing of smoothing a jaggy generated by digital registration. FIGS. 7A and 7B schematically show dots formed by a laser beam which irradiates the photosensitive member 21. Each square shown in FIGS. 7A and 7B represents one dot. FIG. 7A shows dots formed on the photosensitive member 21 when the above-described digital registration is executed for each scan line. As shown in FIG. 7A, a jaggy sometimes stands out at a position where the scan line switches.

The jaggy is made less conspicuous by PWM (Pulse Width Modulation)-controlling a laser beam before and after switching the scan line, as shown in FIG. 7B. FIG. 7B shows a state in which PWM control is done at a resolution of $^1/_7$ per dot. A figure described in each square in FIGS. 7A and 7B represents the duty of a laser beam when forming each dot. A FIG. "2" means a duty of $^2/_7$, and a FIG. "7" means a full duty. PWM control is executed such that the sum of a duty (e.g., $^2/_7$) at a main scanning position on the first line and a duty (e.g., $^5/_7$) at the same main scanning position on the second line equals a full duty ($^7/_7$), as shown in FIG. 7B. The output image processing unit 96 (to be described later) implements this processing by performing interpolation processing (to be described later) at a jaggy in accordance with the degree of curvature of the scan line. Based on the interpolated image data, PWM control of a laser beam is done. In this way, image data undergoes image processing to smooth a jaggy.

Figure 8:
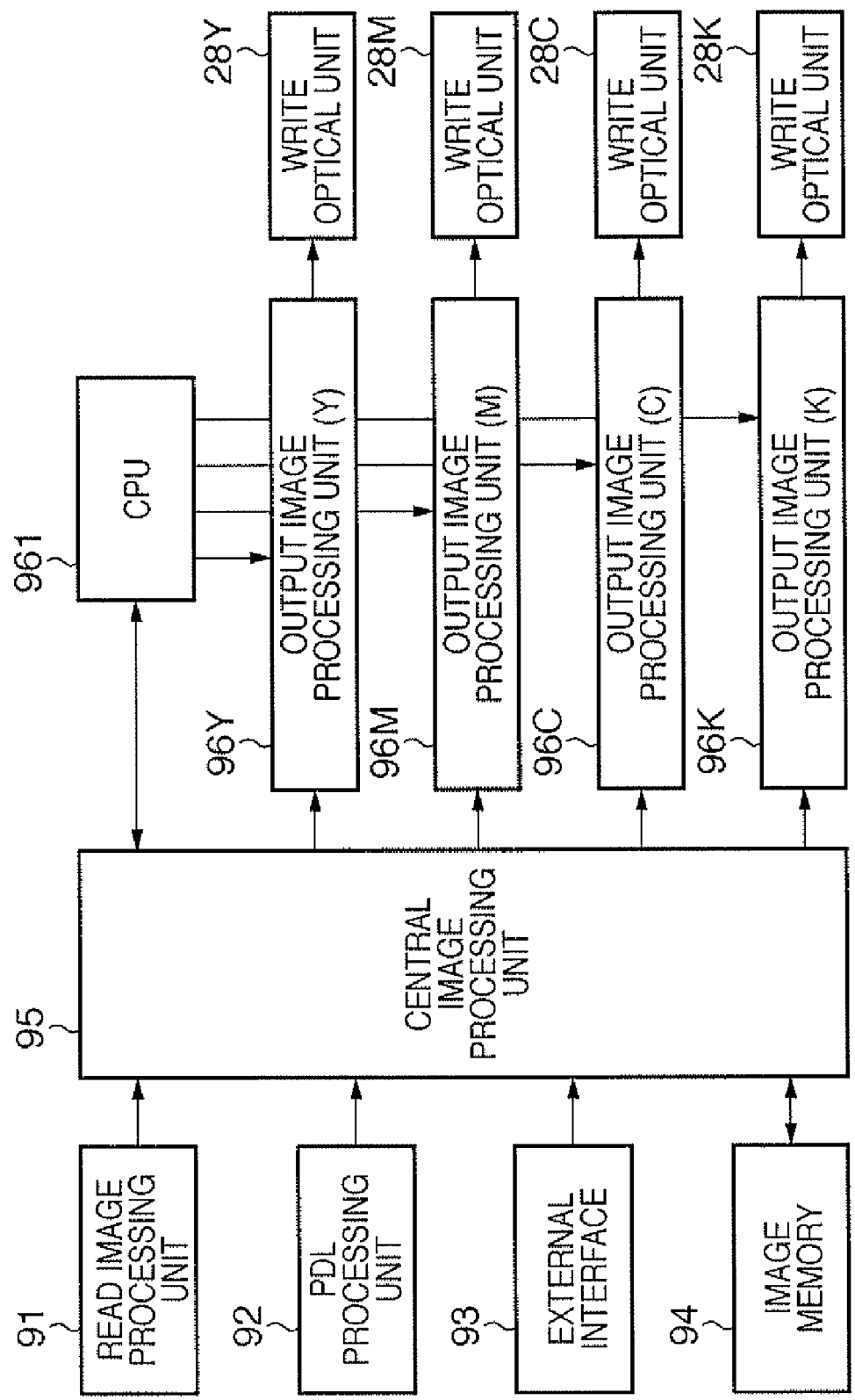
FIG. 8 is a block diagram of an image processing unit which performs image processing including digital registration.

An image processing unit which performs image processing including the above-described digital registration will be explained with reference to the block diagram of FIG. 8. A read image processing unit 91 transfers, to a central image processing unit 95, image data obtained by performing image processing such as shading correction dependent on a reading device for an image signal scanned by the color scanner 1.

The central image processing unit 95 stores the image data in an image memory 94, reads it out from the image memory 94 at a timing corresponding to a distance at which the photosensitive member is arranged, and transfers the image data to the output image processing unit 96. The central image processing unit 95 executes image processing for the above-mentioned digital registration for each scan line. The central image processing unit 95 can transmit/receive image data to/from an external device via an external interface 93 and a telephone line, network, or the like.

When received image data is PDL (Page Description Language) data, a PDL processing unit 92 rasterizes it into image data processible by the output image processing unit 96.

The central image processing unit 95 executes color conversion processing to convert R, G, and B image data of respective pixels into Y, M, C, and K image data of toner colors. When the central image processing unit 95 recognizes that the received image is a halftone image such as a natural image, it executes halftone processing such as dot halftoning or dither processing for image data in the halftone image area having undergone color conversion processing, improving the reproducibility of the halftone image.

Figure 9:
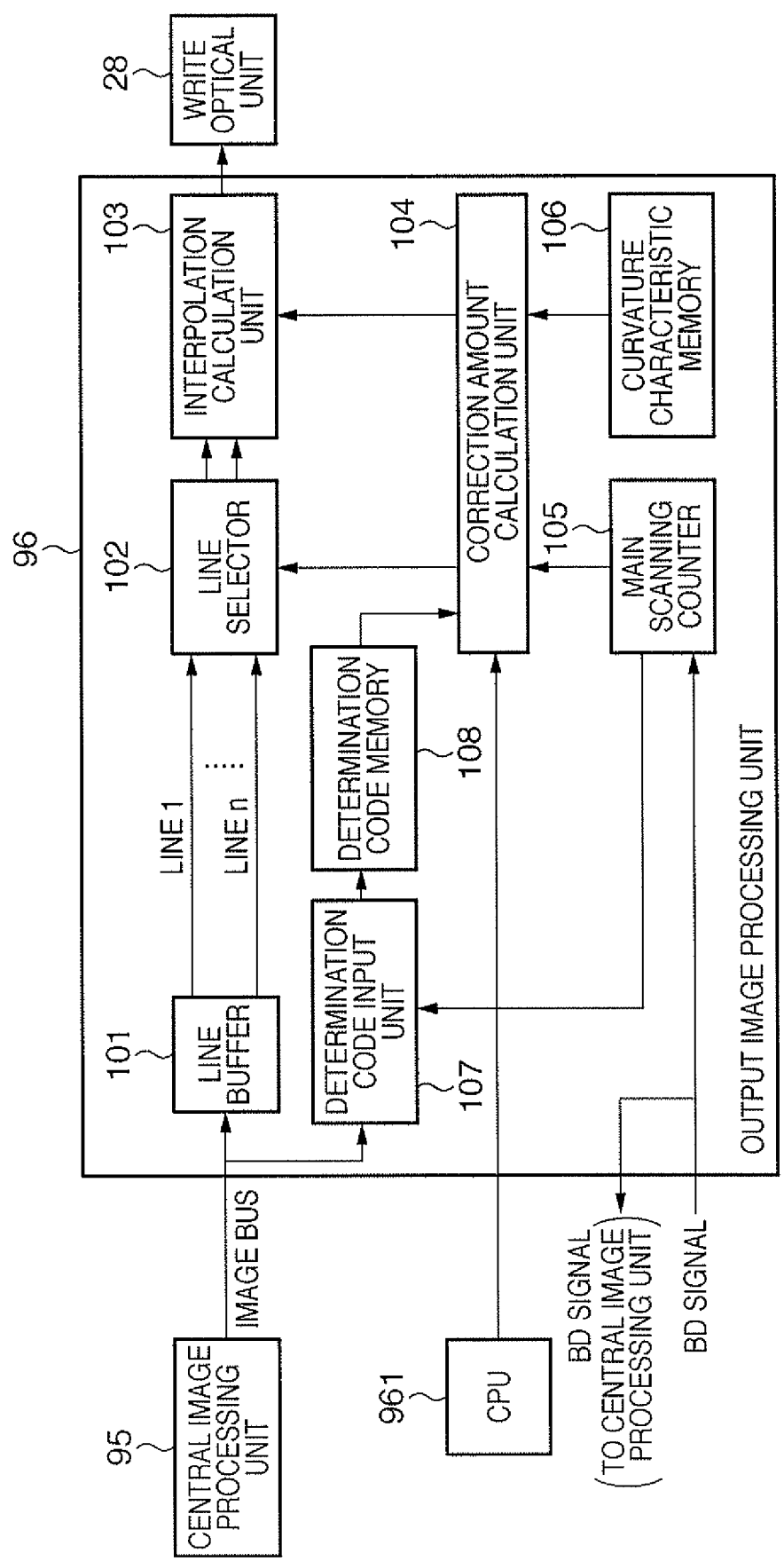
FIG. 9 is a block diagram of an output image processing unit 96.

The output image processing units 96, i.e., 96Y, 96M, 96C, and 96K cause the corresponding write optical units 28 to emit laser beams corresponding to image data. When controlling the write optical unit 28, each output image processing unit 96 performs PWM control to smooth a jaggy generated by the above-described digital registration. FIG. 9 is a block diagram of the output image processing unit 96. The output image processing units 96Y, 96M, 96C, and 96K have the same arrangement. The output image processing units 96Y, 96M, 96C, and 96K independently perform digital registration to execute digital registration processes corresponding to the write optical units 28Y, 28M, 28C, and 28K, reducing the misalignment between the colors.

The output image processing unit 96 performs the above-described digital registration processing and interpolation processing. To perform digital registration for each line, a line buffer 101 stores line data of n lines (four or more lines in the first embodiment) in the main scanning direction. As described with reference to FIG. 5, digital registration is done by selecting line data corresponding to the degree of curvature by a line selector 102 from a plurality of line data held in the line buffer 101. Every time line data of one line is transferred, the line buffer 101 holds the transferred line data. At the same time, the line buffer 101 shifts, by one line, line data already held in it, and deletes the oldest line data. The line buffer 101 always holds line data necessary for digital registration.

To perform the above-described interpolation processing, the line selector 102 selects line data of two lines corresponding to the degree of curvature from a plurality of line data held in the line buffer 101. More specifically, the line selector 102 selects line data of two successive lines to be shifted for digital registration in accordance with the calculation result of a correction amount calculation unit 104. Line data of two lines selected by the line selector 102 can change depending on the main scanning position. The line selector 102 outputs the selected line data of two lines to an interpolation calculation unit 103. Accordingly, the curvature of the scan line of a laser beam is corrected. In the first embodiment, the curvature of the scan line of a laser beam is corrected by the output image processing unit 96, but may also be corrected by the central image processing unit 95. In this case, correction information (correction position and correction amount) stored in the curvature characteristic memory 106 is transmitted to the central image processing unit 95. Based on the correction information, the central image processing unit 95 performs image processing to correct the curvature of the scan line of a laser beam.

The interpolation calculation unit 103 executes correction processing for line data of two lines output from the line selector 102 in accordance with the calculation result of the correction amount calculation unit 104.

The correction amount calculation unit 104 calculates correction amounts for digital registration and interpolation processing in accordance with the degree of curvature of the scan line, and outputs the respective correction amounts to the line selector 102 and interpolation calculation unit 103. The degree of curvature of the scan line is stored as correction information in the curvature characteristic memory 106. The correction information includes correction positions to be corrected in the main scanning direction, and correction amounts at the respective correction positions (correction amounts in the sub-scanning direction perpendicular to the main scanning direction). The correction information is generated when a CPU 961 executes the above-mentioned scan line curvature degree detection processing at a predetermined timing such as the initialization operation of the image forming apparatus. The correction information is stored in the curvature characteristic memory 106 under the control of the CPU 961.

The correction amount calculation unit 104 reads out the correction information (correction position and correction amount) from the curvature characteristic memory 106. The correction amount calculation unit 104 grasps the irradiation position of a laser beam on one scan line in accordance with an output (main scanning position information) from a main scanning counter 105. The correction amount calculation unit 104 calculates a correction amount (selects target lines) for digital registration in accordance with the main scanning position, and calculates the interpolation coefficient of interpolation processing.

FIG. 10 is a view for explaining the detailed operation of the correction amount calculation unit 104. The pixel ID is managed as 1, 2, 3, . . . sequentially from the start of one line. The numerical value of the correction amount is a numerical value read out from the curvature characteristic memory 106. The numerical value of the correction amount represents an amount by which the scan path (locus) of an actual scan line is adjusted to the scan path (reference scan path) of an ideal scan line in the main scanning direction. A correction amount "1" means correction of one line. The integer part of the numerical value of the correction amount represents a line (first select line) to be selected from a plurality of line data held in the line buffer 101. Another line (second select line) to be selected is indicated by a numerical value obtained by adding "1" to the integer part of the numerical value of the correction amount. The decimal part of the numerical value of the correction amount represents an interpolation coefficient in interpolation processing.

Letting $\alpha$ be a correction coefficient output from the correction amount calculation unit 104, the interpolation calculation unit 103 performs interpolation processing:

$$\text{interpolation calculation output} = \text{first select line} \times (1-\alpha) + \text{second select line} \times \alpha$$

Figure 11A:
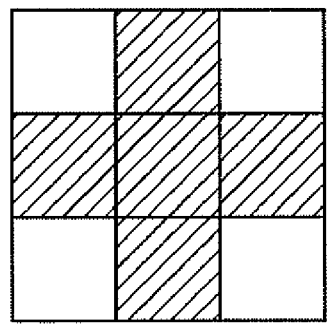
FIGS. 11A to 11C are views for explaining states in which interpolation processing is done for image data having undergone dither processing.
Figure 11B:
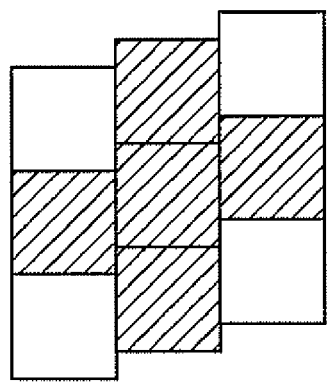
Figure 11C:
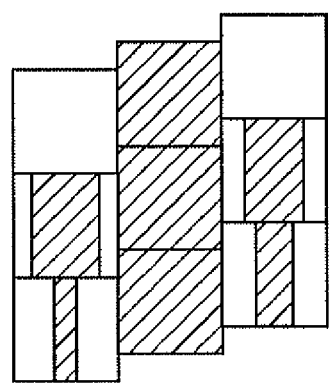

This interpolation processing is effective for smoothing a jaggy generated upon performing digital registration for image data of a text or line image. However, if the interpolation processing is executed for image data having undergone halftone processing such as dither processing, the image quality may degrade. FIGS. 11A to 11C are views for explaining states in which interpolation processing is done for image data having undergone dither processing. FIG. 11A shows image data having undergone dither processing by the central image processing unit 95 in accordance with a dither pattern of 3×3 dots in order to express the halftone density. FIG. 11B shows dots formed on the photosensitive member 21 on the basis of the dither pattern shown in FIG. 11A while the scan line curves. When the scan line curves, the output image processing unit 96 executes the above-described digital registration. In this case, if the output image processing unit 96 performs interpolation processing as well, the dither pattern is multiplied by the correction coefficient, unbalancing the density in the dither pattern or generating small dots, as shown in FIG. 11C. The unbalanced density in the dither pattern and an unstable toner amount attached to small dots influence the reproducibility of the halftone density.

To prevent this, the central image processing unit 95 notifies the output image processing unit 96 of an image area having undergone halftone processing such as dither processing. The output image processing unit 96 performs interpolation processing for an image area where no halftone processing has been done, and does not perform interpolation processing for an image area where halftone processing has been done. That is, it is recognized whether image data represents a halftone image. When scanning a laser beam in accordance with image data representing a halftone image, the scan line of a laser beam is not smoothed.

More specifically, before outputting image data of one line to the output image processing unit 96, the central image processing unit 95 outputs determination codes representing an area in one line where interpolation processing is permitted and an area where it is inhibited. FIG. 12 is a timing chart showing timings when the central image processing unit 95 outputs a determination code and image data to the output image processing unit 96. In synchronism with a main scanning sync signal, the main scanning counter 105 counts the number of pixels corresponding to main scanning position information. The central image processing unit 95 time-divisionally transfers a determination code and image data to the output image processing unit 96 via an image bus. Note that image data is 4-bit data and can express 16 tone levels.

It is desirable to output a determination code corresponding to each pixel on one line to the output image processing unit 96. However, in the embodiment, to reduce the data amount of the determination code, one line is divided into 512 areas, and a determination code corresponding to each area is output. The determination code suffices to represent whether or not to perform interpolation processing, and is 1-bit data per area. Hence, determination codes for 512 areas are formed from 512 bits. When one line is formed from 8,192 pixels and divided into 512 areas, the number of pixels per area is 16. In this case, the determination code corresponds to 16 pixels of one area. A determination code "0" means executing no interpolation processing, and a determination code "1" means executing interpolation processing.

The central image processing unit 95 generates a determination code "0" for an area where halftone processing such as dither processing has been done, and a determination code "1" for an area where no halftone processing has been done. The central image processing unit 95 stores these determination codes in the image memory 94 together with image data. The central image processing unit 95 may also generate a determination code "0" for a halftone area and a determination code "1" for a non-halftone area regardless of whether halftone processing has been done. In image formation, the central image processing unit 95 time-divisionally outputs, to the output image processing unit 96 via the image bus for each line, determination codes and image data which are stored in the image memory 94. Since the determination code is transferred via the image bus for image transfer, the cost of a connector, connection cable, and the like which connect the central image processing unit 95 and output image processing unit 96 can be reduced.

A determination code input unit 107 in the output image processing unit 96 stores a determination code input via the image bus in a determination code memory 108. Based on the determination code stored in the determination code memory 108, the correction amount calculation unit 104 in the output image processing unit 96 switches whether or not to perform interpolation calculation for each area of one main scan line.

Figure 13:
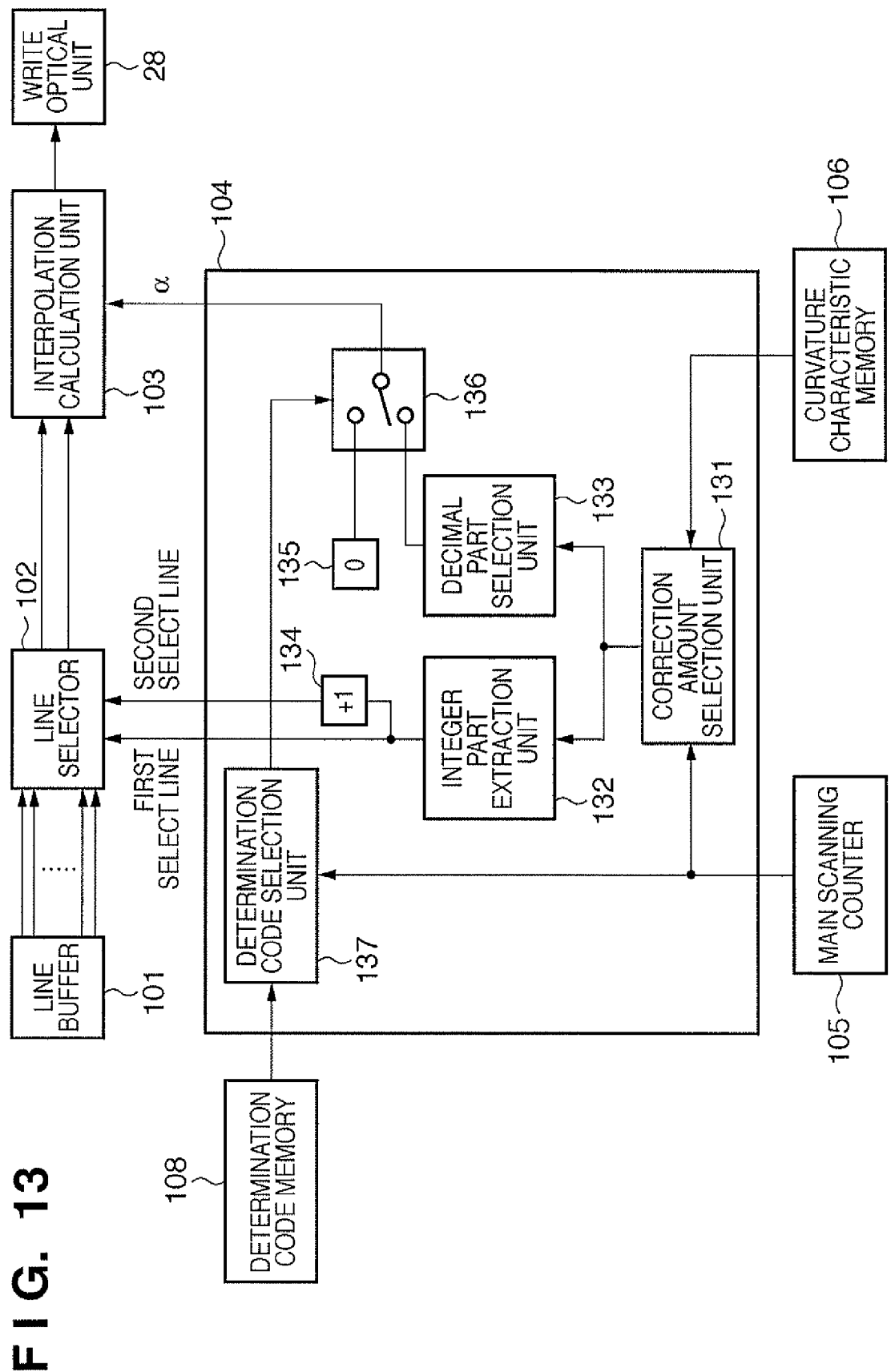
FIG. 13 is a block diagram of the correction amount calculation unit 104.

FIG. 13 is a block diagram of the correction amount calculation unit 104. A correction amount selection unit 131 reads out, from the curvature characteristic memory 106, a correction amount corresponding to a count value (main scanning position) indicated by the main scanning counter 105. An integer part extraction unit 132 extracts the integer part of the correction amount output from the correction amount selection unit 131. The integer part extracted by the integer part extraction unit 132 is input as a first select line signal to the line selector 102. The integer part extracted by the integer part extraction unit 132 is incremented by one by an adder 134, and the resultant integer part is input as a second select line signal to the line selector 102.

A determination code selection unit 137 reads out, from the determination code memory 108, a determination code corresponding to a count value (main scanning position) indicated by the main scanning counter 105, and inputs it to an interpolation coefficient selection unit 136. A decimal part selection unit 133 extracts the decimal part of the correction amount output from the correction amount selection unit 131. In accordance with the determination code input from the determination code selection unit 137, the interpolation coefficient selection unit 136 selects either an output from a memory 135 which stores a correction coefficient "0" or an output from the decimal part selection unit 133. The interpolation coefficient selection unit 136 outputs the selected output as an interpolation coefficient α to the interpolation calculation unit 103. The interpolation coefficient selection unit 136 selects an output from the decimal part selection unit 133 when the determination code is "1", and an output from the memory 135 which stores the correction coefficient "0" when the determination code is "0". When the interpolation coefficient α is "0", an interpolation calculation output in the interpolation calculation unit 103 is only the first select line, and the line selector 102 outputs image data having undergone only digital registration.

As described above, a halftone image area undergoes only digital registration and does not undergo interpolation processing, suppressing the influence on the reproducibility of the halftone density. In a halftone image, a jaggy generated upon performing digital registration hardly stands out, and does not matter even if no interpolation processing is done. The image areas of a text, line image, and the like other than a halftone image undergo digital registration and interpolation processing, smoothing a jaggy generated by digital registration.

(Second Embodiment)

Figure 14:
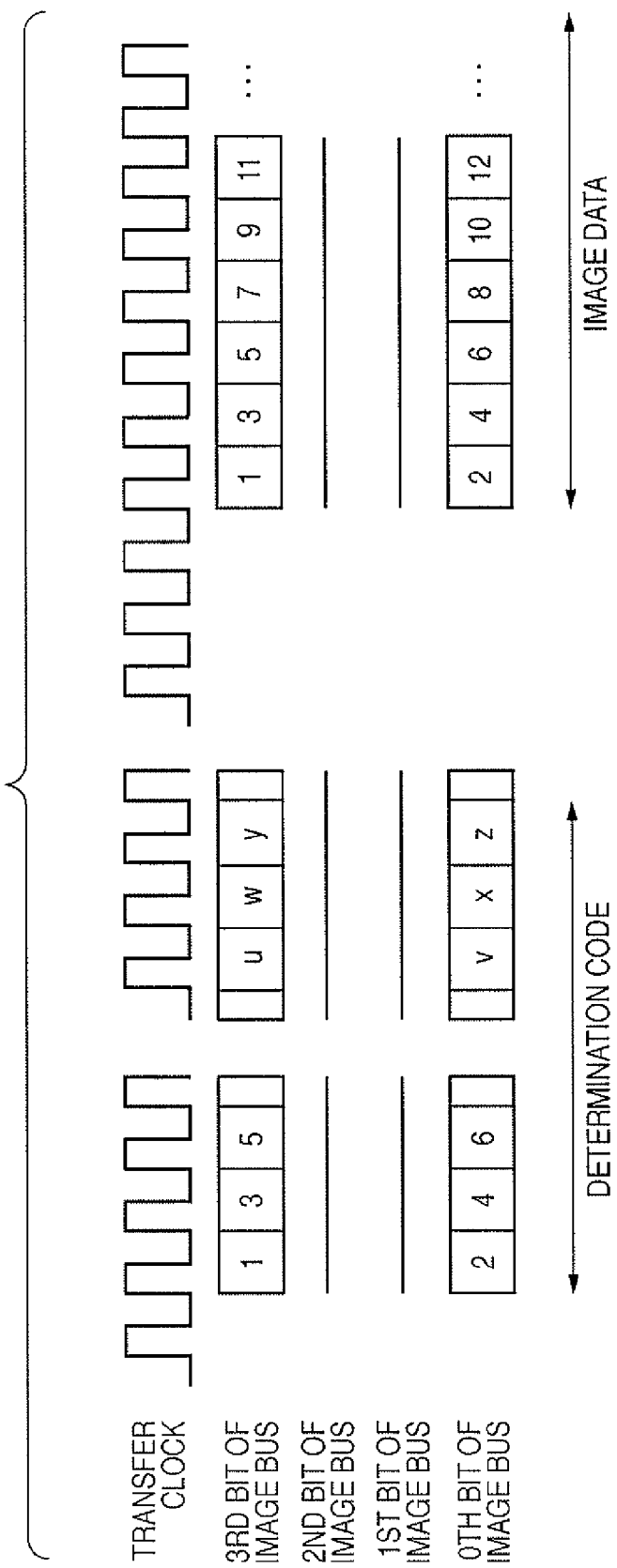
FIG. 14 is a timing chart showing timings when the central image processing unit 95 outputs a determination code and image data of four tone levels (2 bits) to the output image processing unit 96.

In the first embodiment, image data can express only 16 tone levels. In the second embodiment, image data of 16 tone levels (4 bits) or that of four tone levels (2 bits) can be selected. The image bus between a central image processing unit 95 and an output image processing unit 96 can parallel-transfer image data represented by 4-bit. In other words, the image bus has a 4-bit bus width. FIG. 14 is a timing chart showing timings when the central image processing unit 95 outputs a determination code and image data of four tone levels (2 bits) to the output image processing unit 96. When transferring image data of 16 tone levels (4 bits), the central image processing unit 95 uses all the four bits of the image bus. When transferring image data of four tone levels (2 bits), the central image processing unit 95 uses two bits (0th and 3rd bits) which are partial bits among four bits.

The central image processing unit 95 transfers determination codes using the same bits as those for transferring image data. A determination code input unit 107 receives determination codes from only the 0th and 3rd bits of the image bus which transfers the determination codes. The determination code input unit 107 stores the received determination codes in a determination code memory 108. This can implement data transfer which makes image data and a determination code correspond to each other regardless of the image bus configuration.

(Third Embodiment)

Figure 15:
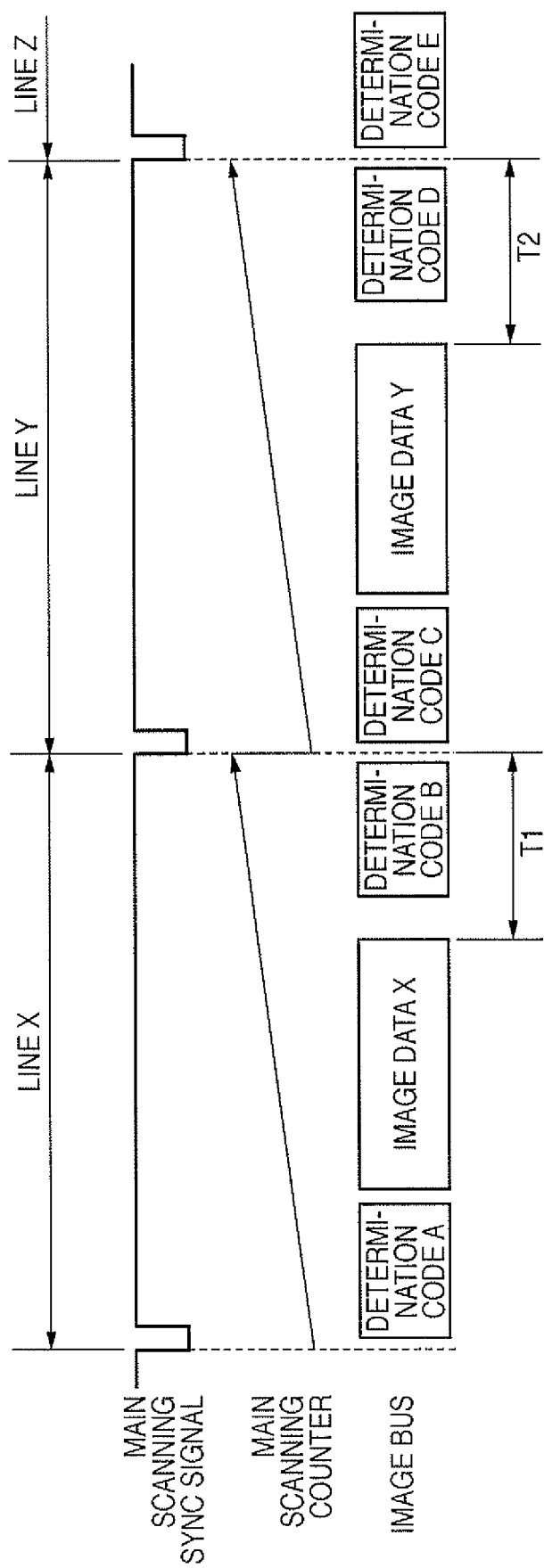
FIG. 15 is a timing chart showing timings when the central image processing unit 95 outputs determination codes for 2,048 areas and image data to the output image processing unit 96.

In the first embodiment, one line is divided into 512 areas, and a determination code corresponding to each area is transferred. The third embodiment will explain an arrangement in which one line is divided into 2,048 areas and a determination code corresponding to each area is transferred. When one line is formed from 8,192 pixels and divided into 2,048 areas, the number of pixels per area is four. In this case, the determination code corresponds to four pixels of one area. Determination codes for 2,048 areas are formed from 2,048 bits, and this data amount is too large to transfer, similar to the first embodiment. FIG. 15 is a timing chart showing timings when a central image processing unit 95 outputs determination codes for 2,048 areas and image data to an output image processing unit 96.

When the central image processing unit 95 determines that all the determination code and image data cannot be transferred for a line Y in FIG. 15, it divides the determination code, and transfers the divided determination codes at different timings prior to corresponding image data Y. In a time T1 until a main scanning sync signal for the line Y becomes active low after transferring image data X of a line X, the central image processing unit 95 transfers a divided determination code B. After the main scanning sync signal for the line Y becomes active low, the central image processing unit 95 transfers a determination code C, and then transfers image data Y corresponding to the determination codes B and C.

In a time T2 until a main scanning sync signal for the next line Z becomes active low after transferring image data Y, the central image processing unit 95 transfers a divided determination code D. After the main scanning sync signal for the line Z becomes active low, the central image processing unit 95 transfers a determination code E, and then transfers image data corresponding to the determination codes D and E.

When the data amount of a determination code exceeds a predetermined amount, the determination code is divided to transfer the divided determination codes. Even a determination code of a large data amount can be transferred without changing the image data counting start timing of the main scanning counter. Also, a determination code of a large data amount can be transferred without increasing the transfer clock speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-212272, filed Aug. 20, 2008, and Japanese Patent Application No. 2009-027792, filed Feb. 9, 2009, which are hereby incorporated by reference herein in their entirety.

What is claimed is:

1. An image forming apparatus comprising:
a scanning unit which deflects a light beam in a scanning direction to form an image on a photosensitive member;
a distortion correction unit which corrects input image data based on a distortion of a scan line of the light beam deflected by said scanning unit; and
a smoothing unit which performs a smoothing for a jaggy of the image data corrected by said distortion correction unit,
wherein said smoothing unit does not perform the smoothing when the corrected image data represents a halftone image, and
wherein the light beam is irradiated based on the corrected image data.

2. The apparatus according to claim 1, wherein said smoothing unit performs image processing for the smoothing on image data, and outputs the image data to said scanning unit.

3. The apparatus according to claim 2, wherein said smoothing unit multiplies image data of a plurality of lines by a coefficient for smoothing a jaggy, and outputs the image data to said scanning unit.

4. The apparatus according to claim 1, further comprising an image processing unit which transmits image data to said distortion correction unit,
wherein said image processing unit recognizes an area representing a halftone image, and transmits, to said smoothing unit in correspondence with the area representing a halftone image, a determination code representing not to perform image processing for the smoothing, and
said smoothing unit switches, in accordance with the determination code, whether to perform the image processing for the smoothing.

5. The apparatus according to claim 4, wherein said image processing unit time-divisionally transmits the determination code and image data to said distortion correction unit via a transmission line.

6. The apparatus according to claim 5, wherein
the transmission line includes an image bus that transmits image data represented by a plurality of bits, and
when transmitting image data represented by partial bits among the plurality of bits, said image processing unit transmits the determination code using the partial bits.

7. The apparatus according to claim 5, wherein when a data amount of the determination code exceeds a predetermined amount, said image processing unit divides the determination code and transmits the divided determination codes.

8. The apparatus according to claim 4, wherein said image processing unit performs halftone processing for image data representing a halftone image.

9. The apparatus according to claim 8, wherein the halftone processing includes dither processing.

* * * * *